United States Patent
Chainer et al.

(10) Patent No.: US 6,611,395 B1
(45) Date of Patent: Aug. 26, 2003

(54) ROTATING MEDIA RECORDING SYSTEM WITH ADAPTIVE TRACK DENSITY

(75) Inventors: Timothy J. Chainer, Putnam Valley, NY (US); Edward J. Yarmchuk, Somers, NY (US); Mark D. Schultz, Elmsford, NY (US); Bucknell C. Webb, Ossining, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 09/432,950

(22) Filed: Nov. 3, 1999

(51) Int. Cl.[7] .............................................. G11B 21/02
(52) U.S. Cl. ...................................................... 360/75
(58) Field of Search ........................ 360/75, 48, 77.03, 360/77.05, 77.08, 78.04

(56) References Cited

U.S. PATENT DOCUMENTS

| 5,844,742 A | | 12/1998 | Yarmchuk et al. ............. 360/75 |
| 5,907,447 A | * | 5/1999 | Yarmchuk et al. ............. 360/75 |
| 5,949,603 A | * | 9/1999 | Brown et al. .................. 360/75 |
| 6,091,559 A | * | 7/2000 | Emo et al. ..................... 360/48 |
| 6,437,947 B1 | * | 8/2002 | Uno ......................... 360/75 X |
| 6,466,387 B1 | * | 10/2002 | Ogasawara et al. ....... 360/75 X |

OTHER PUBLICATIONS

Computer Professionals, Magnetic Recording Vol. II: "Computer Data Storage," Chapter Two, "Data Storage on Rigid Disks," pp. 25–37.

* cited by examiner

Primary Examiner—David Hudspeth
Assistant Examiner—James L Habermehl
(74) Attorney, Agent, or Firm—Fleit, Kain, Gibbons, Gutman & Bongini, P.

(57) ABSTRACT

A method for writing tracks on a rotating disk media data storage device comprising the steps of: receiving a set of component parameters; and adjusting track pitch for each of the tracks to be written in each disk according to the component parameters. According to another embodiment a disk drive includes at least one disk comprising a two or more of tracks in which the track pitch between each pair of adjacent tracks is set based on component parameters such as the recording head widths. According to another embodiment a servowriter is adapted to perform the method discussed above.

38 Claims, 9 Drawing Sheets

IF A+C=1  NO GAP

IF A+C>1  NEGATIVE GAP

IF A+C<1  POSITIVE GAP

ROTATING MEDIA RECORDING SYSTEM WITH ADAPTIVE TRACK DENSITY

FIELD OF THE INVENTION

The invention disclosed broadly relates to the field of rotating media mass storage devices, and more particularly relates to the field of recording servodata on hard disk drives.

BACKGROUND OF THE INVENTION

In disk drives, the track density is a predetermined function for each product family. The tolerances of the heads, magnetic variations of the media, and variations in mechanical input noise are all taken into account when setting the track pitch (component parameters). Increased storage can be accomplished by increasing the track density. In the current servowriting process used in manufacturing of disk drives the track density is determined for a product family and is not customized for each individual drive manufactured.

Recording System Overview

In a recording system as shown in FIG. 1, a rotating media 102 and a data head 106, which typically consists of a separate read 152 and write 154 elements, are used to store data in roughly concentric tracks on a storage medium. The head is positioned onto the data tracks 112, 114 by reading sector servo patterns 110, converting them into a voltage signal using read write interface card 124 and amplitude demodulator 140. The output of the demodulator is digitized using A/D converter 142 and input to a microprocessor 144 which is executing a servo control program. The processor calculates a control voltage which is output to DAC 146, converting the value of the control voltage into an analog signal which is input to a VCM driver 148 producing a current which moves the actuator 150 via the voice coil motor (VCM) 108 to position the data head onto the data track. The sector servo patterns are written during the manufacture of the disk drive assembly and are typically spaced at equal angular intervals along the data track. Track densities of modern disk drives are in the range of 10,000 up to 30,000 tracks per inch, so precise placement of the servo tracks is required to define the location of the data tracks.

Sector servo and Data Tracks

In a recording system, the media are servo written with sector servo tracks to allow positioning of the recording head at a radial location, indicated by a track number. An expanded view of a sector is shown in FIG. 2. The sector field consists of servo patterns which in this example are labeled A, B, C, and D and repeat across the surface of the disk. The servo bursts define the center of the servo tracks, and in the example shown there are two servo tracks for each data track. The read element 202 reads the servo bursts A and C, and produces a signal amplitude which is demodulated to create a voltage proportional to the overlap of the head to the servo burst. The difference of the two amplitudes A–C, is input to the microprocessor 144 which computes a control current to the DAC 146 to move the data head 106 to maintain a difference of zero and center the read element 202 on the data track. For example when the signal amplitude of the A burst 204 on Servo Track 1 is equal to the signal amplitude of the C burst 208 on Servo Track 3, then the read element (202) is centered on Data Track 1 (216).

The spacing or track pitch of the servo tracks shown as Servo Track Pitch 212, determines the track pitch of the data tracks. In this case the Data Track Pitch 214 is twice that of the Servo Track Pitch. One of the determining factors in setting the pitch is the tolerance of the heads. For example in modern heads in which the magnetoresistive read and inductive write transducers are separate elements, the tolerances are given for each element as shown below.

|  | Width | Tolerance (3 sigma) |
|---|---|---|
| Write | 2.4 um | +/−0.5 microns |
| Read | 2 um | +/−0.4 microns |

The pitch would typically be set to insure that when writing Data Track 1 (216) the write element does not overlap Data Track 2 (218) and overwrite the previously written track which can result in a loss of data. To achieve this, the track pitch is set to exceed the width of the widest write head in the population of write heads used for the disk drive program to insure a gap 220 between adjacent data tracks. In this example the widest write width is 2.9 microns. In addition, magnetic and mechanical inputs which limit the ability of the read head to stay centered on the data track, which are commonly referred to as track misregistration, are part of the statistical calculation performed in setting the track pitch for the product. Today, products have a defined track pitch which is used for all the disk surfaces and drives manufactured, and do not adapt the track pitch for each individual surface or drive manufactured based on drive components such as the read or write heads, spindle bearings, etc. (component parameters) or track misregistration, magnetic performance, etc. (system parameters).

SUMMARY OF THE INVENTION

Briefly, according to the present invention there is provided a method of measuring the gaps between adjacent tracks in a recording system during servowriting and allowing the setting of the servo track pitch based on the component or system parameters of individual drives thereby overcoming a limitation of the statistical method of setting track pitch.

DESCRIPTION OF THE PREFERRED EMBODIMENT

Referring to FIG. 3 there is illustrated a gap measurement procedure according to an aspect of the invention. Bursts A 312 and C 310 are written at a spacing equal to that of the data tracks and are seamless in the sense that each burst and its respective edges are defined by a single write operation and therefore directly reflect the written track width. These could be: 1) the actual product servo patterns as in FIG. 2 if this type is employed; 2) temporary patterns added for this measurement purpose; or 3) patterns associated with a self-servowrite propagation process.

Figure 1:
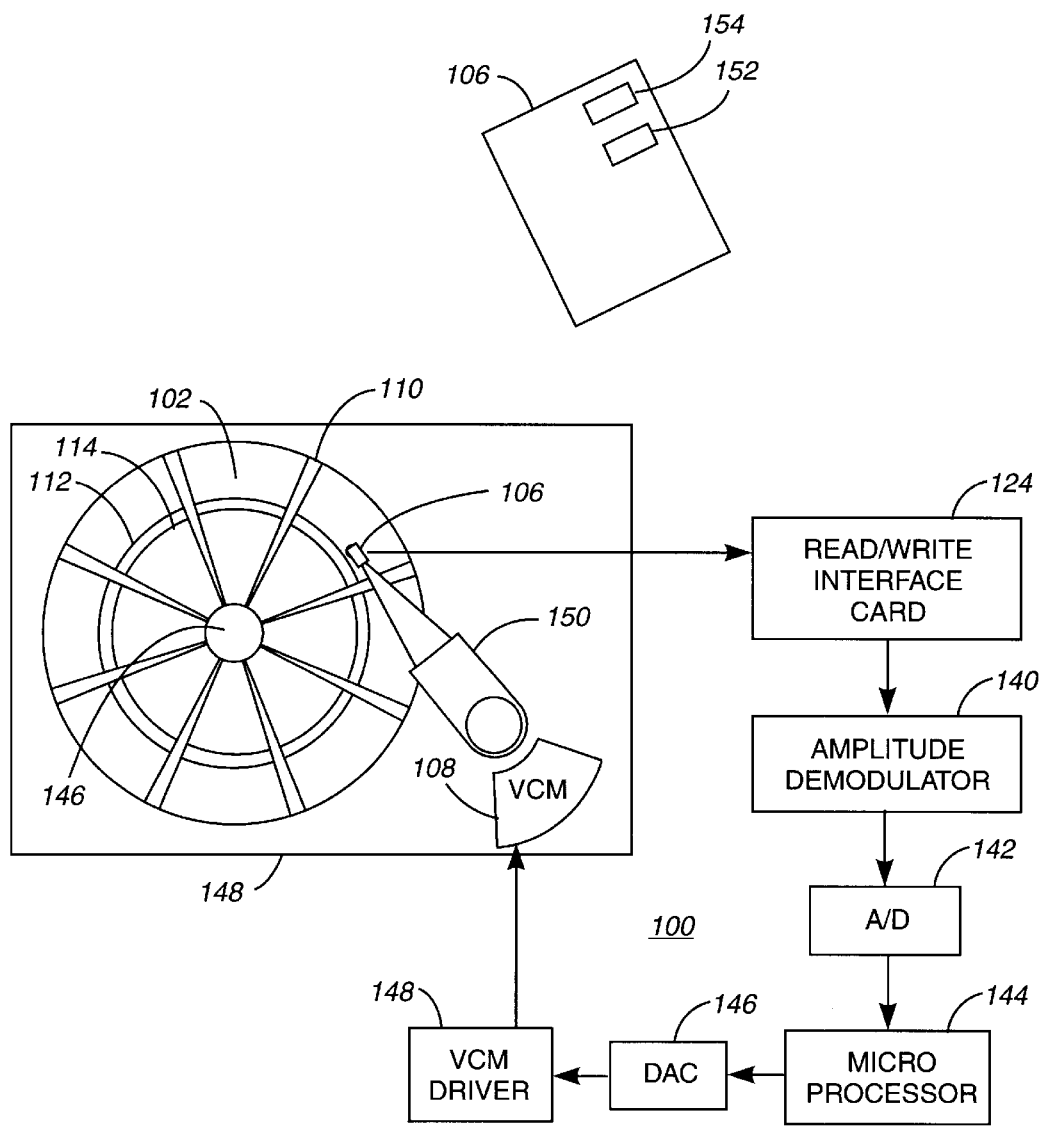
FIG. 1 is an illustration of a disk drive according to the invention.
Figure 2:
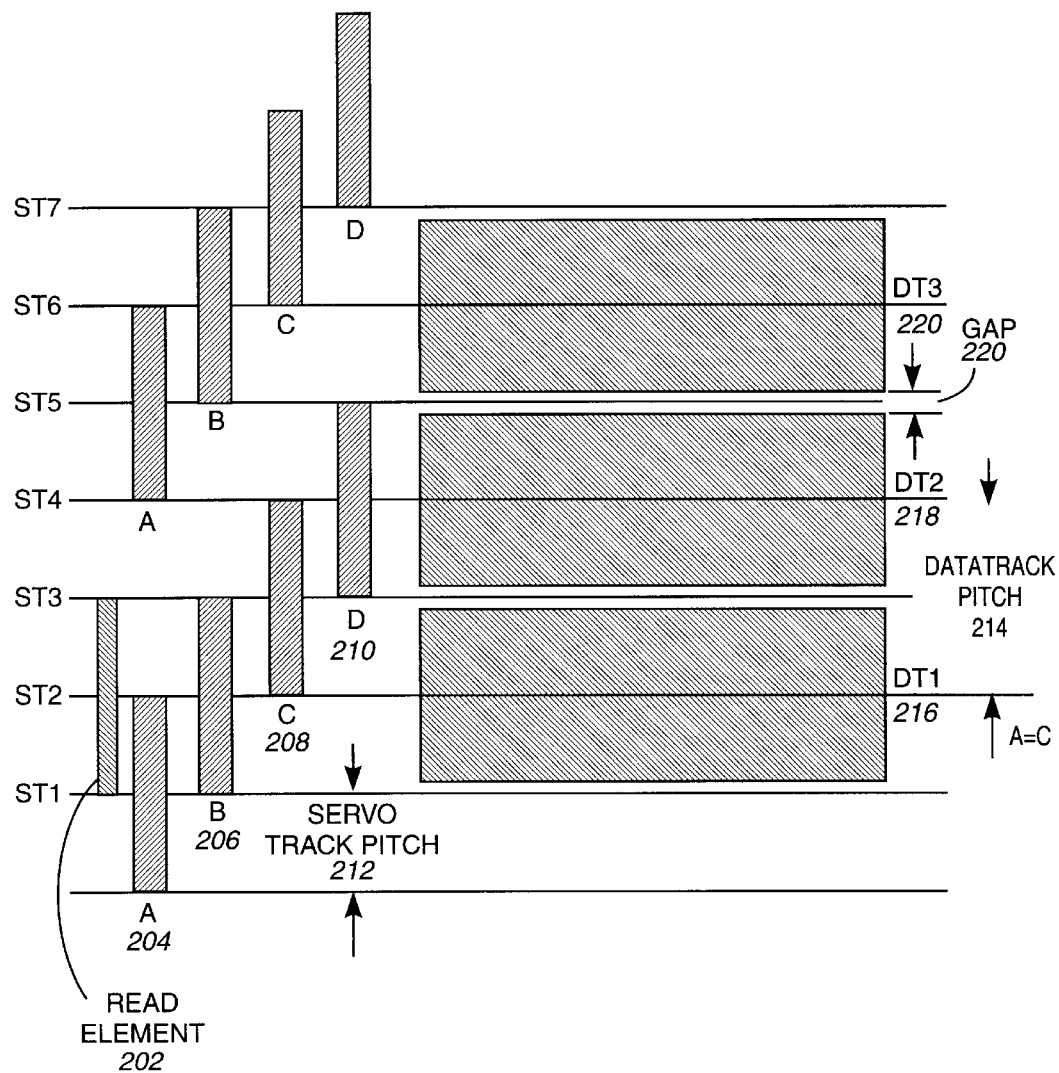
FIG. 2, shows an expanded view of a sector.
Figure 6:
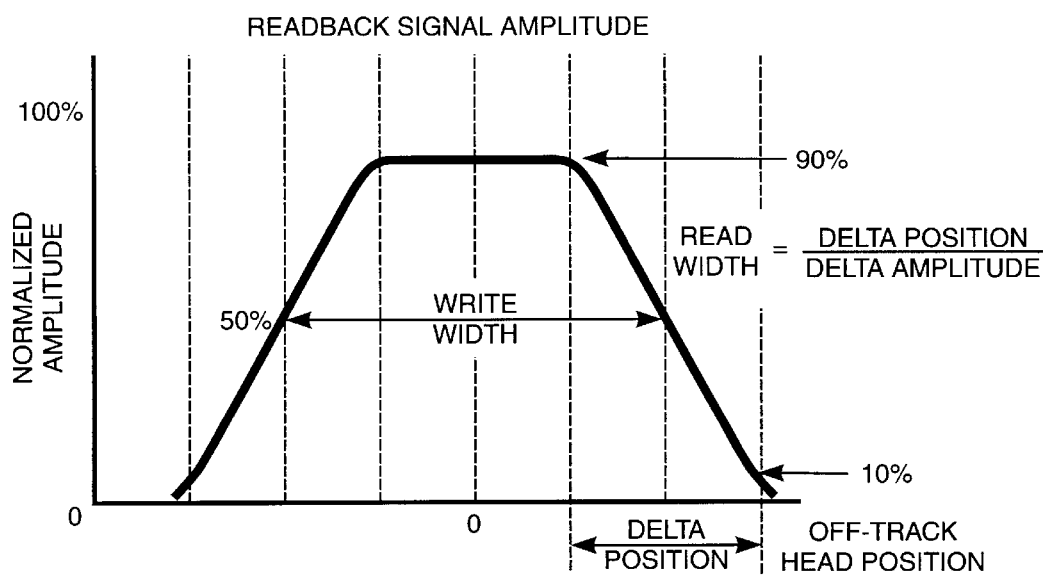
FIG. 6 illustrates a readback signal amplitude vs. position.

The magnetic read element 302 is positioned on Servo track 306 and produces a readback signal roughly proportional to the geometric overlap of the read element as it moves over burst A on Servo Track 3 (308) and burst C on Servo Track 1 (304). Dividing the readback signal by the on-track signal obtained with the read element centered over a burst shown as the amplitude at x=0 in the readback signal amplitude in FIG. 6 provides normalized signal amplitudes Va and Vc that correspond to the fractional overlap of the read element with respect to the A and C bursts. The on-track signal could, for example, equal the amplitude of the B burst as shown in FIG. 2 where the read element is centered on servo track 2. According to the invention, the sum of the normalized signal amplitudes of the A and C bursts is the overlap signal, Va+Vc. This is related to the magnetically measured "gap" between Servo Track 1 and Servo Track 3. Assuming a linear relationship of readback signal amplitude verses off track position as shown in the head profile example of FIG. 6, where the profile signal amplitude varies linearly with the off-track head position in a range from 10% to 90% of the normalized signal amplitude, the gap is given by:

$$\text{Gap} = \{1-(Va+Vc)\} \times Rw \quad \text{Eq 1:}$$

where Va and Vc are the normalized signal amplitudes of the A and C bursts, respectively and Rw is the width of the read element.

Figure 3A:
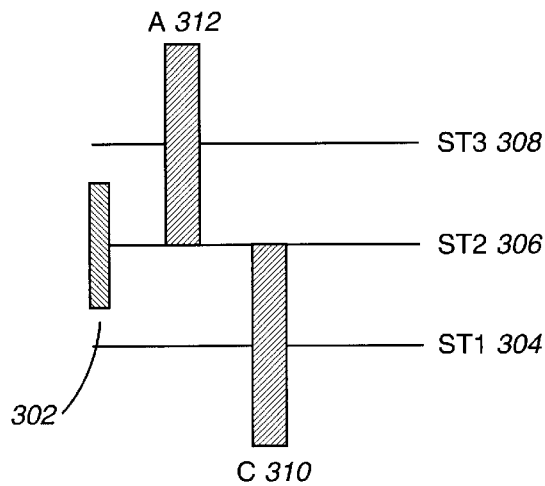
FIG. 3 illustrates a gap measurement procedure.
Figure 3B:
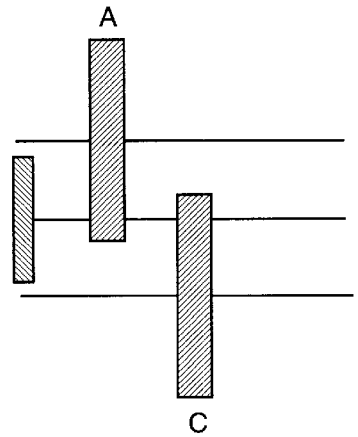
Figure 3C:
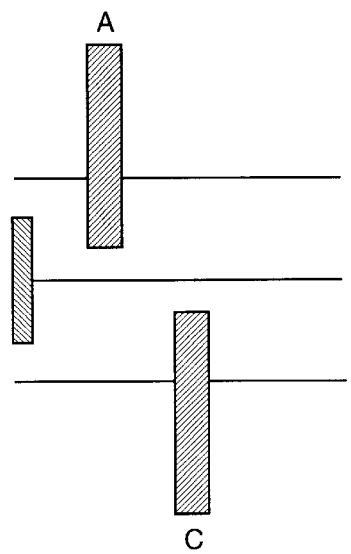

If the overlap, Va+Vc, equals one as shown in FIG. 3A, then the two bursts are butted to each other and there is NO gap between the tracks. As shown in FIG. 3B, if the overlap exceeds one then the gap is negative. If the overlap is less than one, as shown in FIG. 3C, then the gap between tracks is positive.

Since the A and C bursts were written at the same spacing as the data tracks, the gap determined from this formula applies to the data tracks as well. Equation 1 applies to each sector individually, so the gap between data tracks for each sector k is given by:

$$\text{Gap}(k) = \{1-[Va(k)+Vc(k)]\} \times Rw \quad \text{Eq 2:}$$

The DC or average gap between two adjacent data tracks can be calculated by averaging the overlap values over all the sectors of a track. Applying that to Equation 2 yields the following result, where N is the number of sectors:

$$DC\ Gap = \left\{1 = 1/N \sum_{k=1}^{N} [Va(k) + Vc(k)]\right\} \times Rw \quad \text{Eq 3}$$

Figure 4:
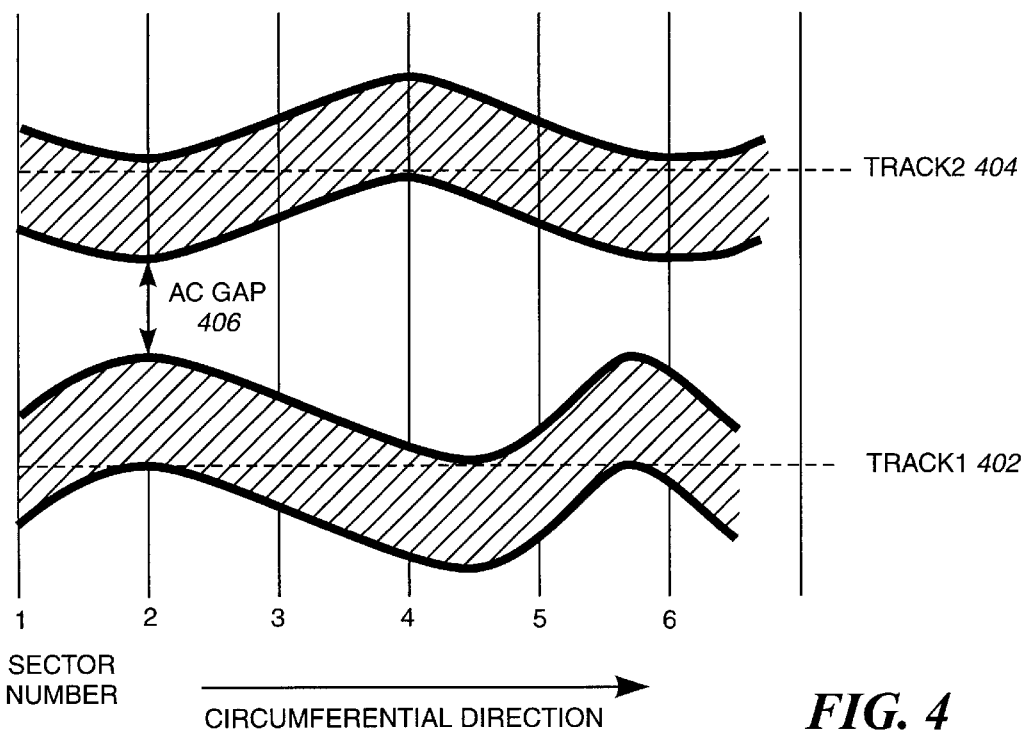
FIG. 4 shows a circumferential variation of the gap between two tracks.

The AC Gap is the circumferential variation of the gap between two tracks as shown in FIG. 4, where the gap between Track2 404 and Track1 402 varies sector by sector and is shown for sector 2 as 406 [shown in FIG. 4]. The AC component of the variation in the gap between data tracks is calculated for each sector of the data track by subtracting the DC average in Equation 3 from the individual measurements of gap variation in Equation 2.

$$AC\ Gap(k) = Gap(k) - DC\ Gap \quad \text{Eq 4:}$$

Method of Controlled Gap Servowriting

A measurement of the gap between servo tracks can be determined during the servowrite process, by stepping back into the servo pattern and measuring the overlap. Without adjustment of the servotrack step size, variation in the write width with radial location (due to for example a change in the fly height of the head as a function of radial position on the disk surface) would cause the DC gap value to change. In the present invention, the step size can be adjusted according to the measured DC gap to maintain a desired gap between the data tracks. For example, a measurement at one location may indicate a DC gap that is less than its target by 0.02 microns. Assuming two servo tracks per data track, the servo track spacing would be increased by 0.01 microns to yield the desired gap.

The AC gap information can also be used to adjust the servotrack spacing. For example, a higher than usual rms value for the AC gap would be better tolerated by increasing the target value for the DC gap.

$$DC\ Gap = Initial\ Gap \times \#f \times \sqrt{1/N \sum_{k=1}^{N} [ACGap(k)]^2}$$

Where the Initial Gap is the gap target and f is a fraction times the RMS value of the AC Gap.

Gap Set Based on TMR Measurement

In one example the gap between tracks can be adjusted based on measurements of the track following misregistration (TMR), which is the non-repeatable error of the disk drive servo control system as the head servos to a track trajectory. The TMR is composed of the response of the servo loop to various input noise terms which can be categorized into electronic, mechanical and magnetic in origin. Examples of the types of input noise terms include: (1) electronics noise in the demodulated servo pattern 140; (2) Analog to Digital quantization errors in 142; (3) Digital to Analog quantization errors in DAC 146 2) mechanical forces on the actuator 150 such as air turbulence caused by spinning disk 102; 3) defects in the spindle bearings 146; 4) external vibration on the base plate 148; 5) magnetic center shift of the data head (152) read transducer; and 6) write width modulation of the written track 112,114. The input noise terms can depend on radial location. The gap between adjacent data tracks must minimally exceed the TMR to ensure that the recording element does not overlap the adjacent track as it writes data on the current track. Overlap of the adjacent track can result in recoverable errors while reading but can also produce non-recoverable errors while writing due to overwriting an adjacent track. In this invention the gap between adjacent tracks can be set based on measurement of the TMR for a DASD product family or individually adapted for each drive manufactured. The measurements would include the TMR at one or more radial locations with interpolation to provide an estimate of the TMR as a function of radius. In one example the TMR is measured for each head at a plurality of radial locations covering the data band. The resulting gap target for the data tracks is then set to for example:

$$\text{Gap (head, track)} = N \times \sigma_{TMR} \text{ (head, track)}$$

where the gap dimensions are set equal to a number N times the sigma of the TMR for a given head and track.

Gap Set for Heads in Bands

In a second example in a disk drive with multiple heads (typically 10 to 20) the gap between tracks could be determined for subgroups of heads. The gap and therefore the track pitch could be set individually on each surface of the multiple head drive. Alternatively, the heads in the drive may be grouped according to write widths and a track pitch may be set for each group of heads, thereby allowing servotrack writing in parallel for all members of a group. The number of heads in a group can be from 1 to N, where N is the number of heads in the file. The banding of heads into a group with a shared track pitch will result in the widest head of the group producing the minimum gap between data tracks, and the other heads with a gap which exceeds this minimum.

Figure 5A:
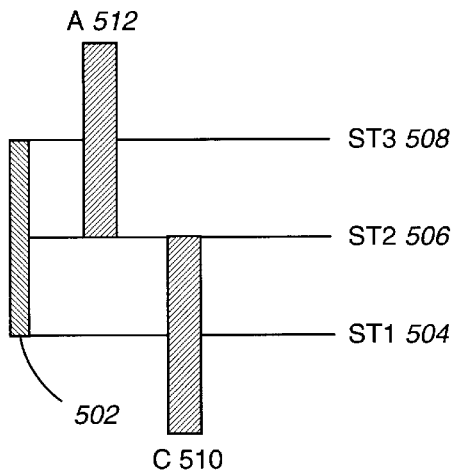
FIGS. 5 A–C illustrate dependence of the relative read to write widths.
Figure 5A:
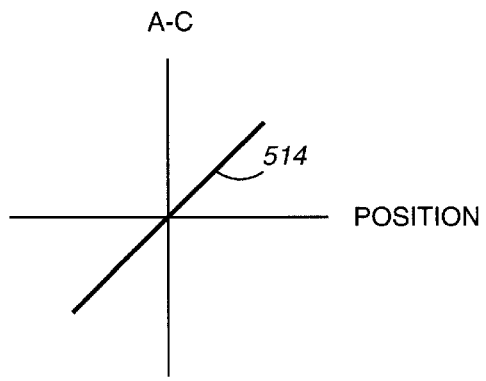
Figure 5B:
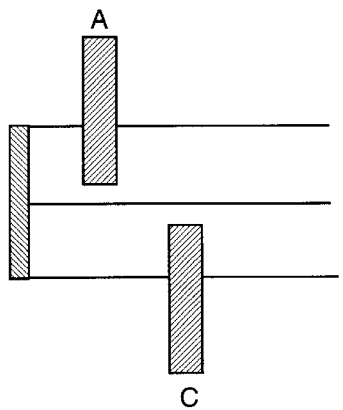
Figure 5B:
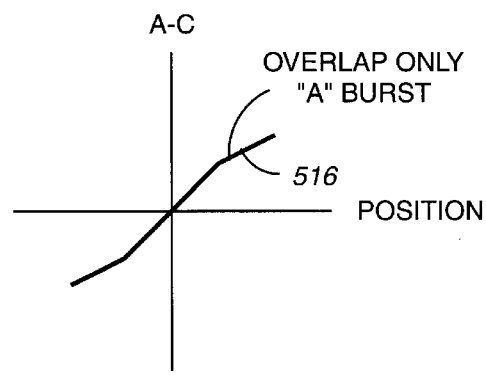
Figure 5C:
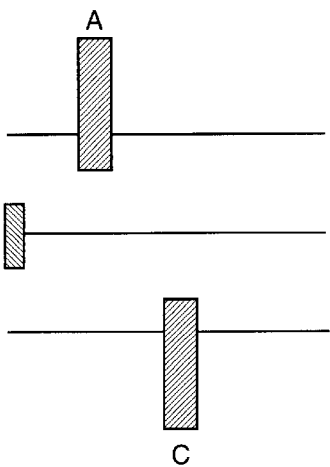
Figure 5C:
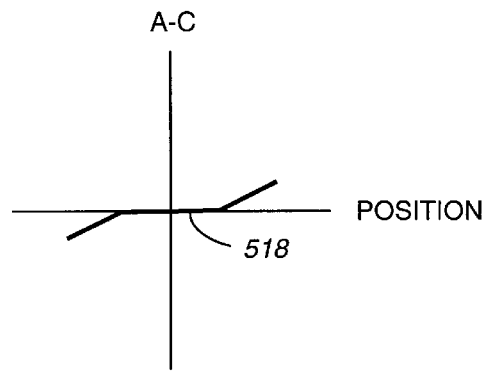

Read width may also be used as a criteria in the grouping of heads, due to the dependence of the read width on the performance of seamless servo patterns as shown in FIGS. 5a, 5b and 5c. The position signal defined by the difference of the normalized readback signal amplitudes of the A(512) and C (510) servo bursts, Va–Vc has a dynamic range determined by the overlap of the read element (502) on the written servo bursts. In FIG. 5A, the position signal (514) has a single defined slope as the read element (502) overlaps both the A and C bursts over the entire range. In FIG. 5b, a gap between A and C servo burst produces a change in slope (516) of the position signal when the read element is overlapping only one of the two bursts. In FIG. 5c, a narrow read element does not produce any position signal 518 when centered, as it does not overlap either the A or C servo bursts. In this case, the track pitch would be reduced to create a linear range of position signal.

In addition for multiple disk files, the Track Misregistration (TMR as described in the previous section) can depend on the location of the disk in the stack, which is typically supported by two bearings. In one example, a bearing defect in one of the two spindle bearings can result in such a dependence.

Setting Servo Track Pitch Using Self-Servowrite Methods

The servotrack pitch may be set using the self-servowrite methods described in U.S. Pat. No. 5,659,436 "Radial Self-propagation Pattern Generation for Disk file Servowriting".

Figure 9:
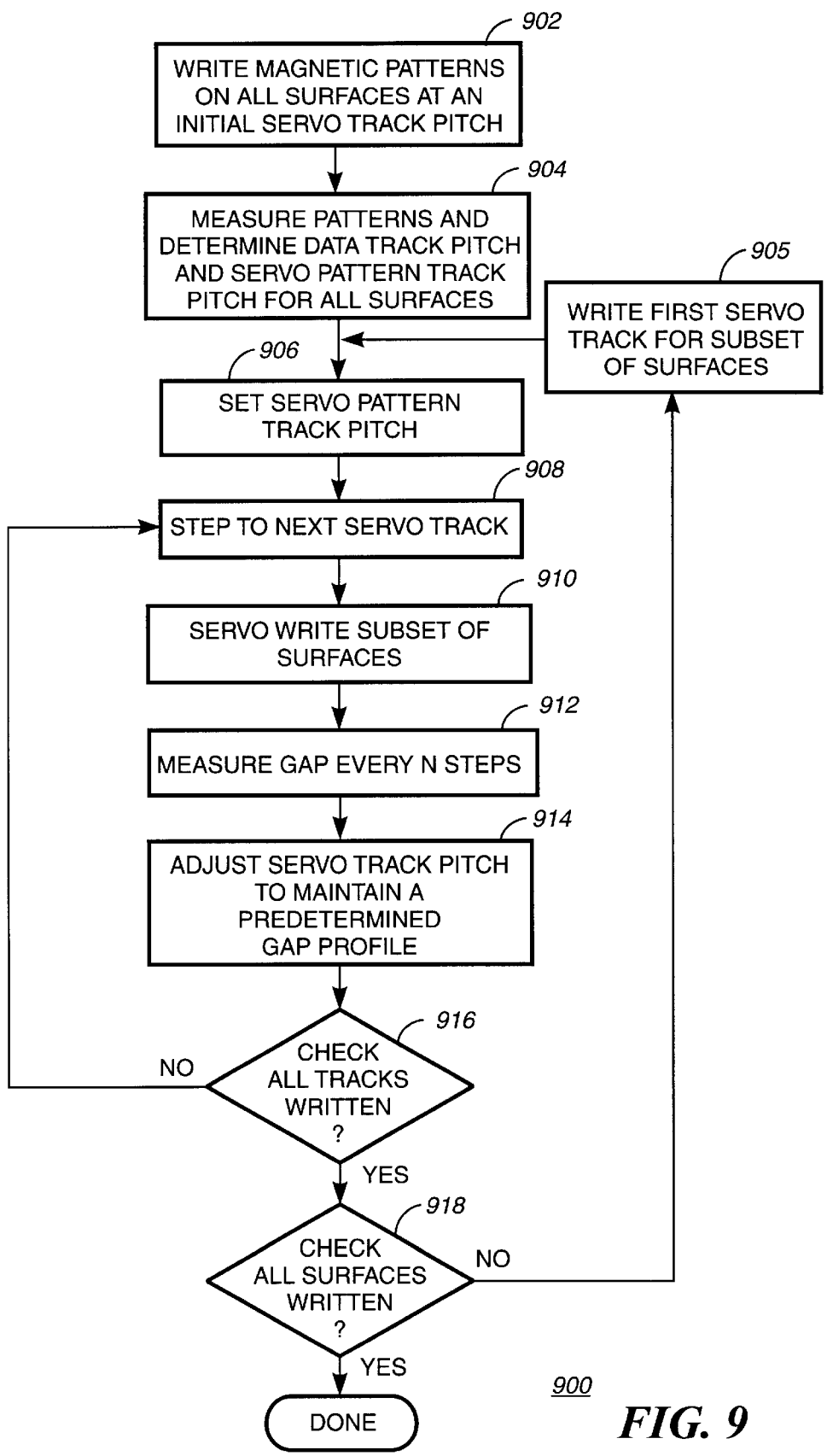
FIG. 9 is a flow chart illustrating a servowriting method according to the invention.

FIG. 9 is a flow chart illustrating a servowriting method with gap measurement according to the invention. In step 902 a servowriter writes magnetic patterns on all surfaces at an initial servo track pitch. Then in step 904 the patterns are measured and the data track pitch and servo pattern track pitch are determined for all surfaces. In step 905, a first servo track is written on a subset of the surfaces. In step 906 the servo pattern track pitch is set. The servowriter then steps to the next servo track in step 908. In step 910 a subset of surfaces are written. The gap between tracks is then measured every N steps in step 912. Then in step 914, the servo track pitch is adjusted to maintain a predetermined gap for each disk surface and track radius. A decision 916 is then made to determine whether all of the tracks have been written. If not, the process 900 returns to step 908. If the tracks have all been written then a decision 918 is made to determine whether all of the surfaces have been written. If they have not, the process 900 returns to step 906. If the surfaces have all been written the process is done.

Setting Servo Track Pitch Using Direct Measurements of Read and Write

Figure 7:
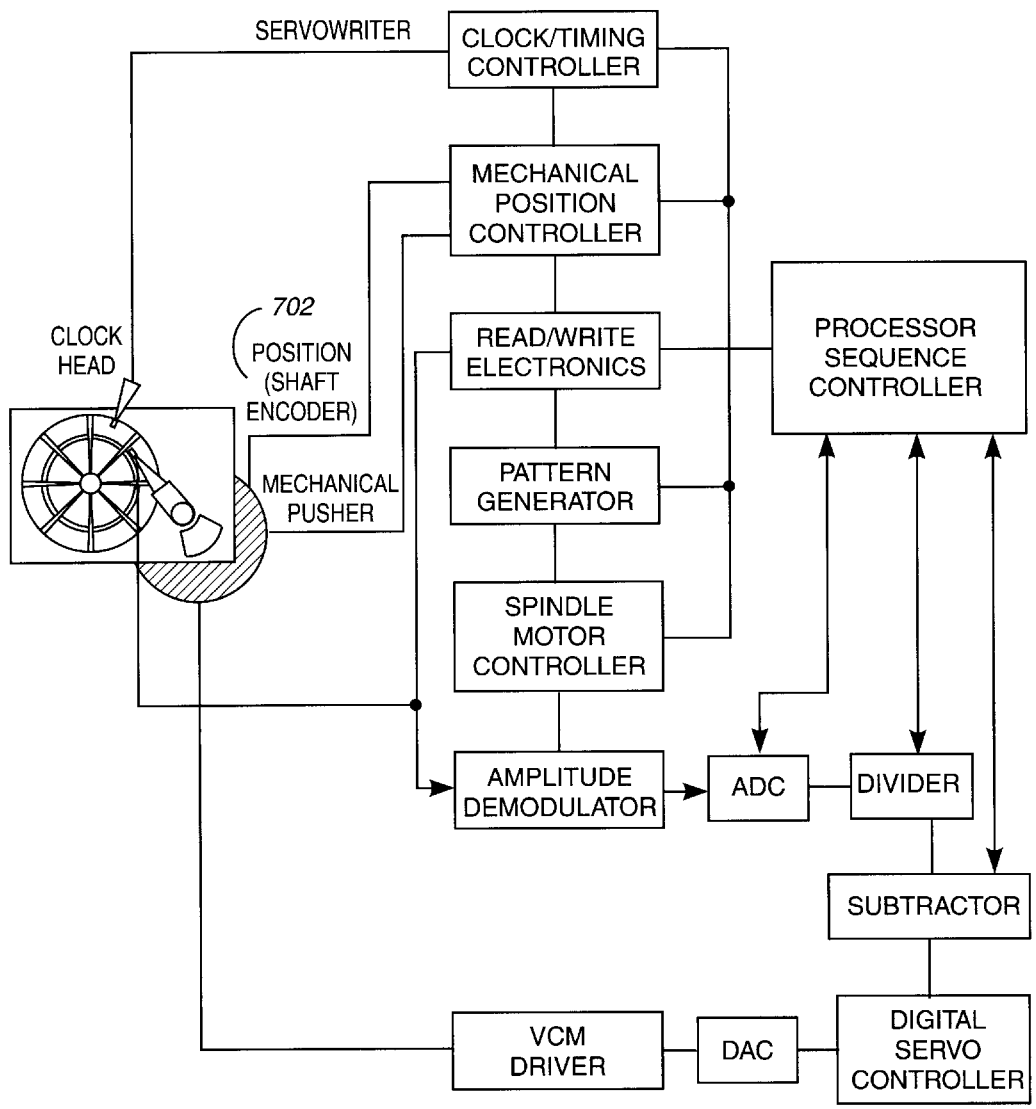
FIG. 7 is a simplified block diagram of servowriter.

In the case of servowriting with an external positioner 702 as shown in FIG. 7 the external positioner can be used to make measurements of the read and write widths by writing patterns on the disk and measuring the readback profile as shown in FIG. 6. The profile provides a magnetic measurement of both the read and write width. The write width is the written track width determined by the distance between the 50% amplitude points as shown in FIG. 6. The read width is determined from the slope of the profile off track position, which in FIG. 6 is shown from the 10% to the 90% amplitude points. The read width, is equal to the inverse of the slope of the normalized profile and is given by:

$$R_w = \frac{\Delta Position}{\Delta Amplitude} \qquad \text{Eq 5}$$

This data could be used as a input to determine the step size of the servo tracks. In one example, the data track pitch could be given Track Pitch=write width+f×write width where f=0.10. In the case where the read width is larger than the write width, the data track pitch would be given by track pitch=read width+f×read width where f=0.01. Subsequently measurements of overlap can be used in addition to maintain a fixed gap, or sufficient gap can be set initially to account for the variation in the written track width.

Figure 10:
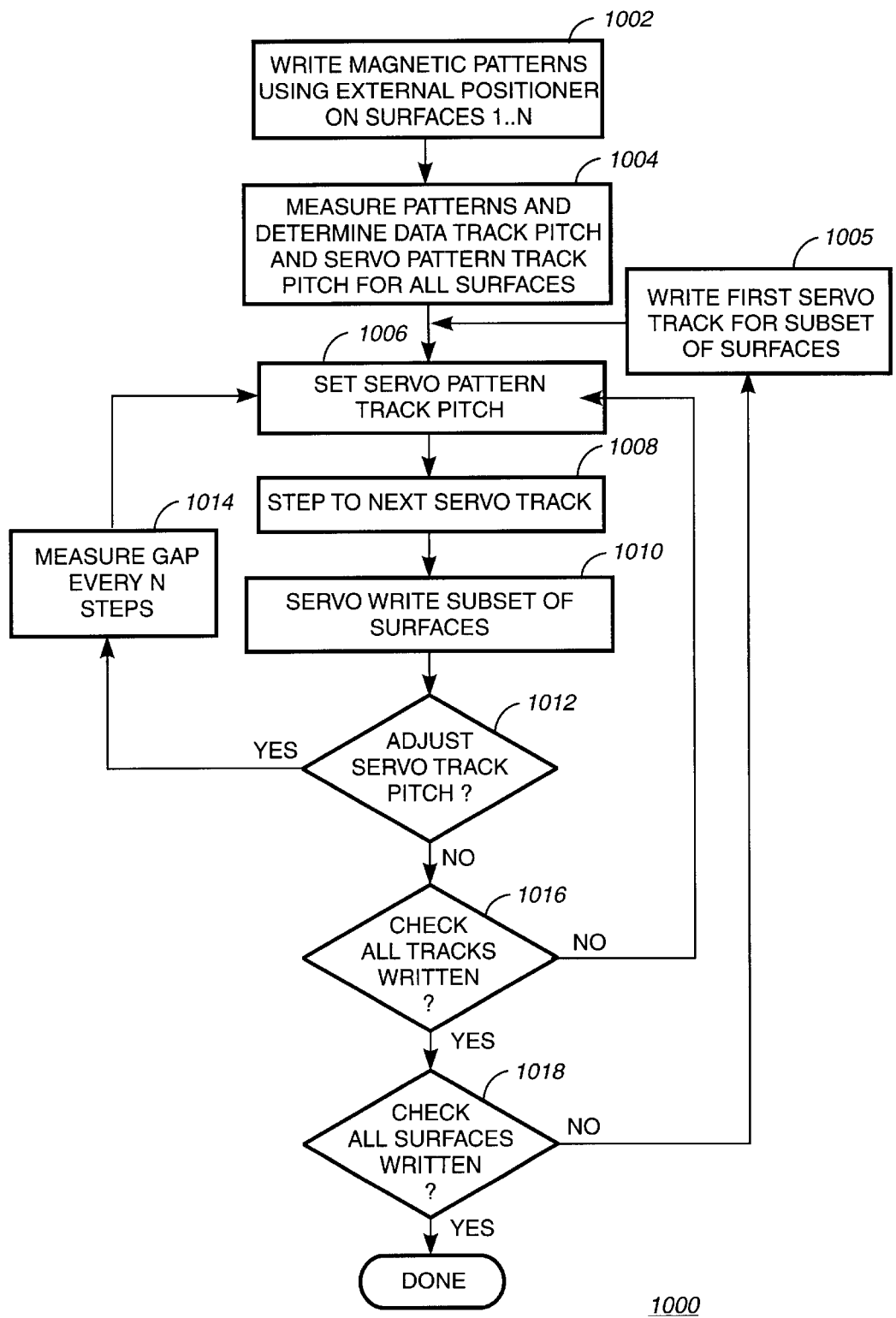
FIG. 10 is a flow chart illustrating a servowriting method according to the invention.

FIG. 10 is a flow chart illustrating a servowriting method 1000 using direct measurements of read and write heads according to the invention. In step 1002 magnetic patterns are written using an external positioner 702 on all surfaces. Then in step 1004 the patterns are measured and the data track pitch and the servo track pitch are determined for all surfaces. In step 1005, a first servo track is written on a subset of the surfaces. In step 1006 a servo pattern track pitch is set. In step 1008 the servowriter steps to the next servo track. In step 1010 a subset of surfaces are servo written. A decision 1012 is then made as to whether the servo track pitch is to be adjusted. If it is, the gap is measured for every N steps in step 1014. The process 1000 then continues at step 1006. If the servo track pitch is not to be adjusted, a decision 1016 is made as to whether all tracks have been written. If they have not, the process 1000 returns to step 1008. If all the tracks have been written, a decision 1018 is made to determine whether all the surfaces have been written. If they have not, the process continues at step 1006. If they have the process is done.

Setting Servo Track Pitch Using Input Parameters

The servo track pitch can be determined by input of the read and write widths, for example from a database containing previously measured values.

Figure 8:
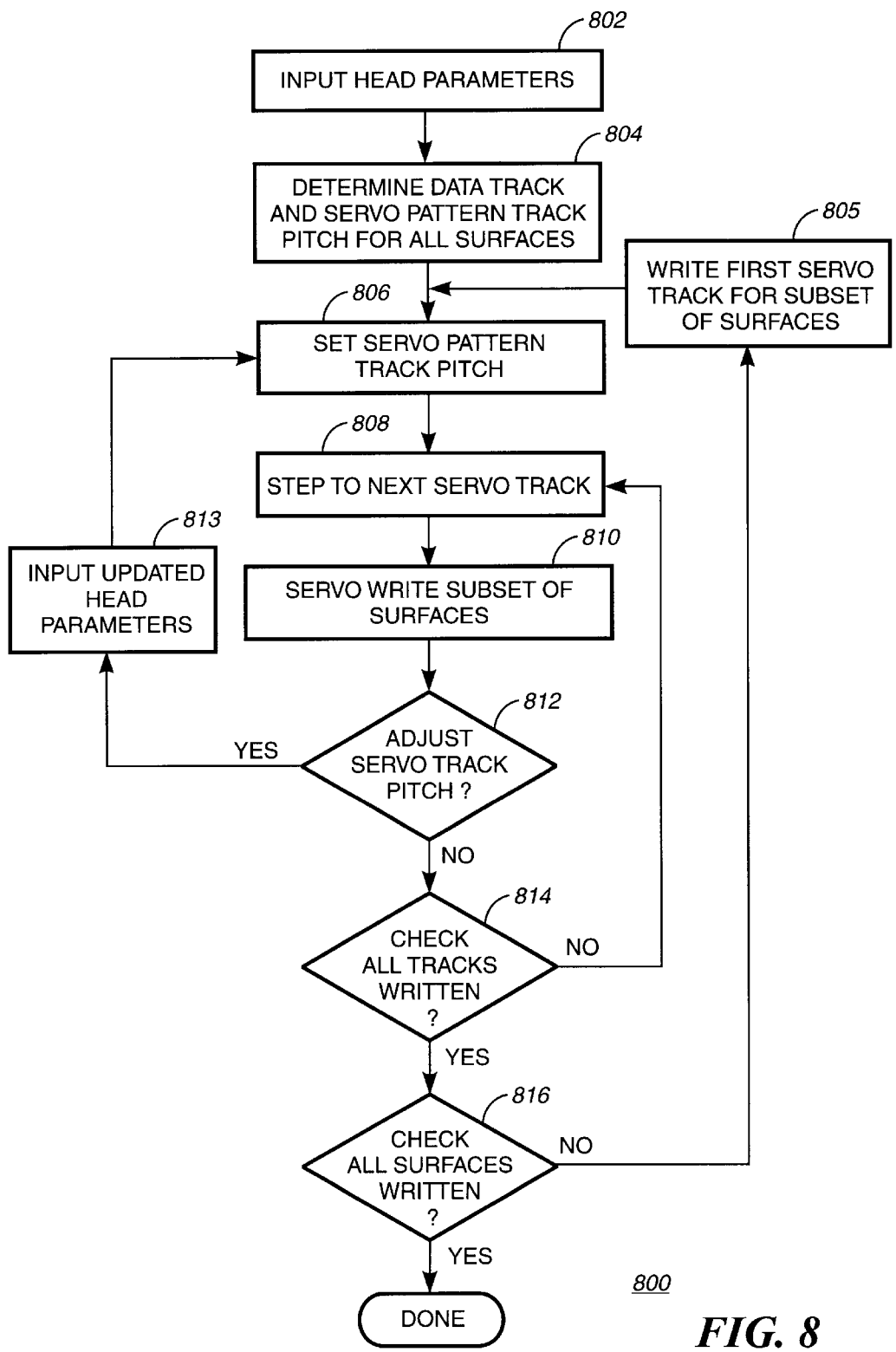
FIG. 8 is a flow chart illustrating a method for the setting of servo track pitch input parameters according to the invention.

FIG. 8 is a flow chart illustrating a method 800 for the setting of servo track pitch from input parameters according to the invention. In step 802 the head parameters are input. Then in step 804 the track pitch for the data and servo pattern are determined for all surfaces of each disk. In step 805, a first servo track is written on a subset of the surfaces. In step 806 the servo pattern track pitch is set. In step 808 the servowriter steps to the next servo track. In step 810 the servowriter writes a subset of surfaces. A decision 812 is made as to whether the servo track pitch is to be adjusted. If it is, updated head parameters are input, step 813 and the process returns to step 806. If it is not, then the process continues at decision 814.

In decision 814, a determination is made as to whether all tracks have been written. If they have not been written, then the process continues at decision 808. If they have been written, a further decision 816 is made to determine whether all surfaces were written. If all of the surfaces have not been written then the process returns to step 806. If all of the surfaces have been written then the process 800 is done.

Therefore, while there has been described what is presently considered to be the preferred embodiment, it will be understood by those skilled in the art that other modifications can be made within the spirit of the invention.

What is claimed is:

1. A servowritng method for writing tracks on a rotating disk media data storage device, the method comprising the steps of:
   receiving a set of system parameters and component parameters, wherein the component parameters relate to components in a data storage device, wherein the data storage device comprises a plurality of surfaces, and wherein the set of system parameters and component parameters are not measured during a servowriting process; and
   adjusting a track pitch to be written on each surface within the plurality of surfaces according to at least one of the component parameters during the servowriting process, wherein the track pitch is adjusted for groups of surfaces within the plurality of surfaces.

2. The method of claim 1 wherein the component parameters comprise write head width.

3. The method of claim 1 wherein the component parameters comprise tolerances of the heads.

4. The method of claim 1 wherein the component parameters comprise magnetic variations of the media.

5. A method of claim 1, wherein the component parameters comprise parameters that relate to the plurality of surfaces and wherein the track pitch varies across at least one of the each surface according to at least one of the component parameters.

6. A servowriting method for writing tracks on a rotating disk media data storage device, the method comprising the steps of:
   receiving a set of system parameters and component parameters, wherein the component parameters relate to components in a data storage device, wherein the data storage device comprises a plurality of surfaces, and wherein the component parameters comprise read head width; and
   adjusting a track pitch to be written on each surface within the plurality of surfaces according to at least one of the component parameters, wherein the track pitch is adjusted for each surface of within the plurality of surfaces.

7. A servowriting method for writing tracks on a rotating disk media data storage device, the method comprising the steps of:
   receiving a set of system parameters and component parameters, wherein the component parameters comprise variations in track misregistration and relate to components in each individual said data storage device; and
   adjusting the track pitch for each of the tracks to be written in each disk according to at least one of the component parameters.

8. A servowriting method of adapting the track pitch of a disk drive to the recording head widths comprising the steps of:
   measuring the gap between servo tracks during the servowriting process; and
   writing servotracks having a servo track pitch such as to maintain a gap between the data tracks.

9. The method of claim 8 wherein the step of measuring includes measuring width that changes as a function of radial position.

10. The method claim 8 wherein the gap between tracks is determined by measurements of the track misregistration in the disk drive of at least one radial position.

11. The method of claim 8, wherein the gap is equal to the read width times a quantity of one minus the overlap signal.

12. The method of claim 8, wherein the gap is near zero.

13. The method of claim 8, wherein the servo track pitch is set for each recording disk.

14. The method of claim 8, wherein the data track pitch is set for each recording disk.

15. The method of claim 8, wherein the servo track pitch is different for each recording disk.

16. The method of claim 8, wherein the data track pitch is different for each recording disk.

17. The method of claim 8, wherein the servo track pitch corresponds to a value for the gap that optimizes a position signal linearity.

18. The method of claim 8, wherein the data track pitch is corresponds to a value that is determined by setting the gap based upon at least one component parameter.

19. The method of claim 8, wherein the servo track pitch and a data track pitch are adapted to each recording surface.

20. The method of claim 8, wherein the servo track pitch and a data track pitch are adapted independently of each other.

21. A method of measuring the DC track squeeze between adjacent tracks rotating disk media storage devices comprising measuring the mean value of an overlap value, wherein the overlap value corresponds to the spacing between adjacent servo tracks.

22. A method of measuring the AC track squeeze between adjacent tracks comprising the steps of:
   measuring track overlap values at a plurality of radial locations on a recording surface;
   determining a mean value of the track overlap values; and
   subtracting the mean value from the track overlap values.

23. A method of servowriting a disk drive with variable track density comprising measuring an overlap value to maintain a predetermined gap between each pair of data tracks, wherein the overlap value corresponds to the spacing between adjacent servo tracks.

24. A method of servowriting a disk drive with variable track density, the method comprising:
   writing magnetic patterns in at least one radial position;
   measuring the read and write width from the readback profile of the magnetic patterns using an external positioner; and
   setting the track pitch for groups of heads to a value based on the measured read and write widths, wherein the groups of head comprise fewer heads than are contained within the disk drive, and wherein each group within the groups comprise heads with read and write widths within a specified range.

25. A disk drive comprising:
   a plurality of disks each comprising a plurality of tracks in which the track pitch between each pair of adjacent tacks is set for each disk of the plurality of disks based upon at least one component parameter relating to a component in the drive.

26. The disk drive of claim 25 wherein the at least one component comprises recording head widths.

27. The disk drive of claim 25 wherein the component parameters comprise tolerances of the heads.

28. The disk drive of claim 25 wherein the component parameters comprise magnetic variations of the media.

29. A disk drive comprising:
   a plurality of disks each comprising a plurality of tracks in which the track pitch between each pair of adjacent tracks is set based on at least one component parameter relating to a component in the drive, wherein data surfaces in the plurality of disks are grouped into different track densities based on the overlap value of the servo tracks, and wherein the overlap value is within a range and wherein each disk within a group has equal track density.

30. A disk drive comprising:

a plurality of disks each comprising a plurality of tracks in which the track pitch between each pair of adjacent tracks is set for each disk of the plurality of disks based upon at least one component parameter relating to a component in the drive wherein the component parameters comprise read head width.

31. A disk drive comprising:

a plurality of disk each comprising a plurality of tracks in which the track pitch between each pair of adjacent tracks is set based on at least one component parameter relating to a component in the drive, wherein the component parameters comprise variations in mechanical input noise.

32. A servowriter apparatus for writing tracks on a rotating disk media data storage device comprising:

means for receiving a set to component parameters, wherein the component parameters comprise variations in mechanical input noise; and means for adjusting the track pitch for each of the tracks to be written in each disk according to at least one of the component parameters.

33. The servowriter of claim 32 further comprising:

means for measuring the component parameters for the device being written upon.

34. The servowriter of claim 32 wherein the component parameters comprise read head width.

35. The servowriter of claim 32 wherein the component parameters comprise write head width.

36. The servowriter of claim 32 wherein the component parameters comprise tolerances of the heads.

37. The servowriter of claim 32 wherein the component parameters comprise variations in mechanical input noise.

38. A disk drive comprising:

a plurality of disks each comprising a plurality of tracks in which a the track pitch between each pair of adjacent tracks is set to a value for fewer than all of the disks within the plurality of disks, wherein each of the disks within the fewer than all of the disks have at least one component parameter value that is unequal and within a specified range.

* * * * *